United States Patent [19]

Sedlmayr

[11] Patent Number: 4,650,280

[45] Date of Patent: Mar. 17, 1987

[54] FIBER OPTIC LIGHT TRANSFER DEVICE, MODULAR ASSEMBLY, AND METHOD OF MAKING

[76] Inventor: Steven R. Sedlmayr, 6974 Olympus Dr., Evergreen, Colo. 80439

[21] Appl. No.: 575,816

[22] Filed: Feb. 1, 1984

[51] Int. Cl.⁴ .......................... G02B 6/08; F21V 7/04
[52] U.S. Cl. ............................ 350/96.27; 350/96.10; 350/96.25; 350/96.28; 350/320; 362/32; 358/901
[58] Field of Search ............... 350/96.24, 96.25, 96.26, 350/96.27, 96.28, 96.10, 320; 362/32; 358/901

[56] References Cited

U.S. PATENT DOCUMENTS

| | | | |
|---|---|---|---|
| 3,043,910 | 7/1962 | Hicks | 350/96.27 |
| 3,141,105 | 7/1964 | Courtney-Pratt | 350/96.24 |
| 3,644,922 | 2/1972 | James et al. | 350/96.24 |
| 4,116,739 | 9/1978 | Glenn | 350/96.27 |
| 4,208,096 | 6/1980 | Glenn | 350/96.27 |

OTHER PUBLICATIONS

Casler, "Manufacturing Matched Fiber Optical Arrays" IBM Tech. Disc., vol. 19, No. 3, 8/71, p. 829.

*Primary Examiner*—William L. Sikes
*Assistant Examiner*—Brian M. Healy
*Attorney, Agent, or Firm*—Fields, Lewis, Pittenger & Rost

[57] ABSTRACT

A fiber optic light transfer device (11) has a plurality of optical fibers (12) with end surfaces (13 and 14). A locator body (21) for the fibers has a multiplicity of parallel slots (22) through which the fibers extend and by which the fibers are located and mechanically held. Each slot has first and second supporting surfaces (24 and 25) at right angles to one another in mutually perpendicular planes. First and second reference supporting surfaces (24R and 25R) locate a reference end fiber (12R) perpendicular to a third plane that is mutually perpendicular to the other two planes and a reference ribbon in the second plane. The further end fibers are located in the first plane and at equally spaced intervals in planes parallel to the second reference plane and, when adhered to the supporting surfaces, precisely locate and mechanically hold the fibers against movement relative to one another in three mutually perpendicular planes. In one method a plurality of channel-shaped members, each containing one ribbon, are stacked one on another and cut on a diagonal to form two identical devices.

16 Claims, 12 Drawing Figures

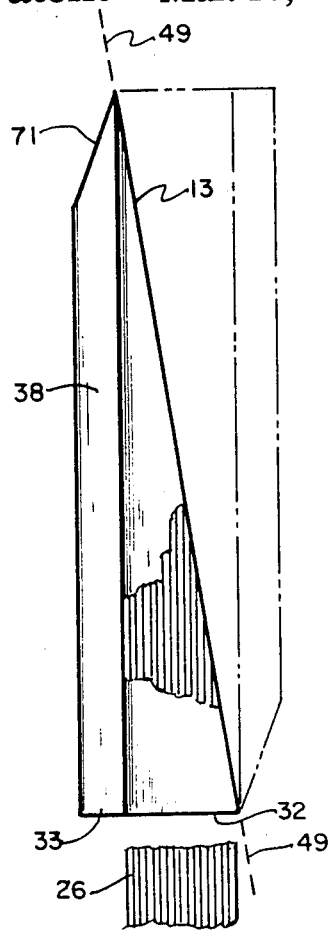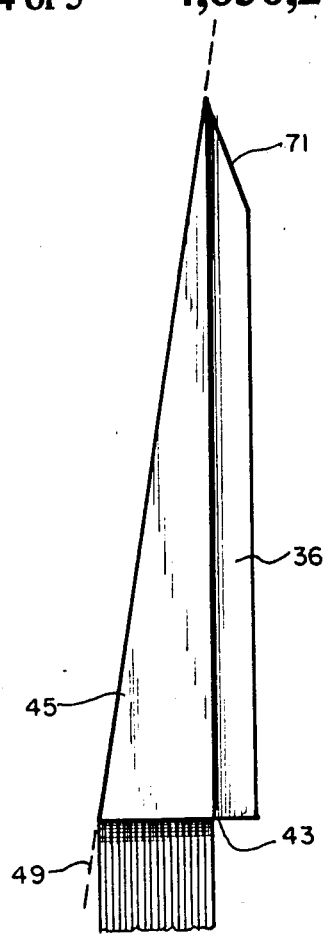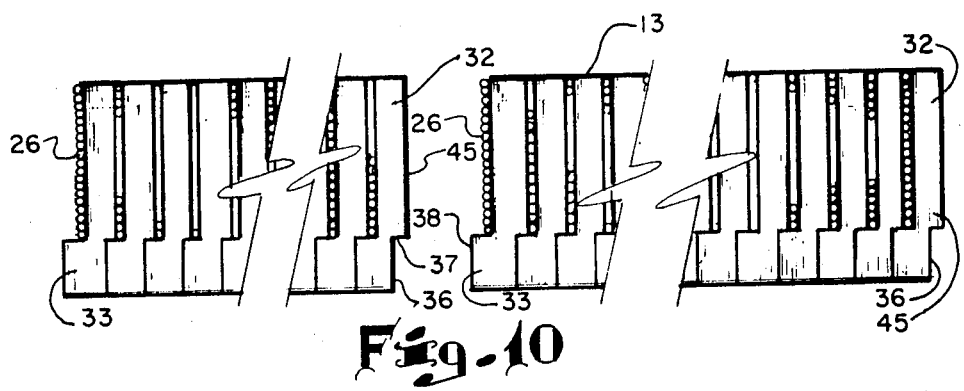

FIBER OPTIC LIGHT TRANSFER DEVICE, MODULAR ASSEMBLY, AND METHOD OF MAKING

TECHNICAL FIELD

This invention relates to novel and improved fiber optic light transfer apparatus and method of making the same.

BACKGROUND ART

The prior art fiber optical light or image transfer devices in general have been relatively complicated to manufacture, cumbersome, space consuming and economically prohibitive for widespread commercial use. The prior art has recognized the need for accurately locating and alining each fiber in an array but the relatively small size of each fiber and the brittleness thereof make this difficult.

Hicks U.S. Pat. No. 3,043,910 uses relatively thin flat spacer strips inclined at an angle to the lengthwise extent of the fibers and therefore lacks a disclosure for accurately locating and holding the fibers in precise location to one another in each of three planes that are perpendicular to one another. The particular problem that is not solved by Hicks is the tendency for one ribbon to skew, squirrel or twist relative to the other along the length of the fibers.

Glenn U.S. Pat. Nos. 4,116,739 and 4,208,096 attempt to solve the problem of accurate alinement and locating of the fibers in relation to one another by using a spirally wound construction. This approach, however, does not both accurately locate and hold the fibers in the three mutually perpendicular planes above discussed.

Further deficiency in the above discussed prior art is the lack of a satisfactory construction for expanding a basic light transfer unit to larger size units without sacrificing the resolution.

DISCLOSURE OF INVENTION

In accordance with the present invention there is provided a light transfer device for image transfer purposes and the like including an optical fiber locator body having a multiplicity of parallel internal slots. Each slot has first and second fiber supporting surfaces disposed in first and second mutually perpendicular planes, respectively. First and second supporting surfaces of a reference slot locate a reference end fiber that extends perpendicular to a third plane, which is perpendicular to the other two planes. The first and second supporting surfaces of further slots locate further end fibers at equally spaced intervals and in the first plane and locate further fiber ribbons in planes parallel to the reference second plane to precisely locate the fibers in relation to the reference fiber and, when adhered to the associated supporting surface, hold the fibers against relative movement in three planes that are perpendicular to one another. The located fibers are cut along a plane that is rotated 90° to the reference plane and at a slight angle to the rotated plane to define an end surface of cut fiber ends. Preferably a locator body is provided at each end of the fibers to maintain the relative positions of each fiber in relation to one another. The method of making involves supporting intermediate portions of the fibers in a block with the slots or a block made up of a plurality of stacked channel-shaped locator members that is cut on a diagonal to form two identical light transfer devices that will stack side by side and end to end to form a modular assembly.

BRIEF DESCRIPTION OF DRAWINGS

The details of this invention will be described in connection with the accompanying drawings, in which:

FIG. 8 is a side elevation view of the locator body with only portions of the fiber ribbon shown in place;

FIG. 9 is a side elevation view of the opposite side of the locator body;

FIG. 10 is an end elevation view of the wide end of two of the image transfer devices that are separated before being brought together in a modular assembly;

DETAILED DESCRIPTION

Figure 1:
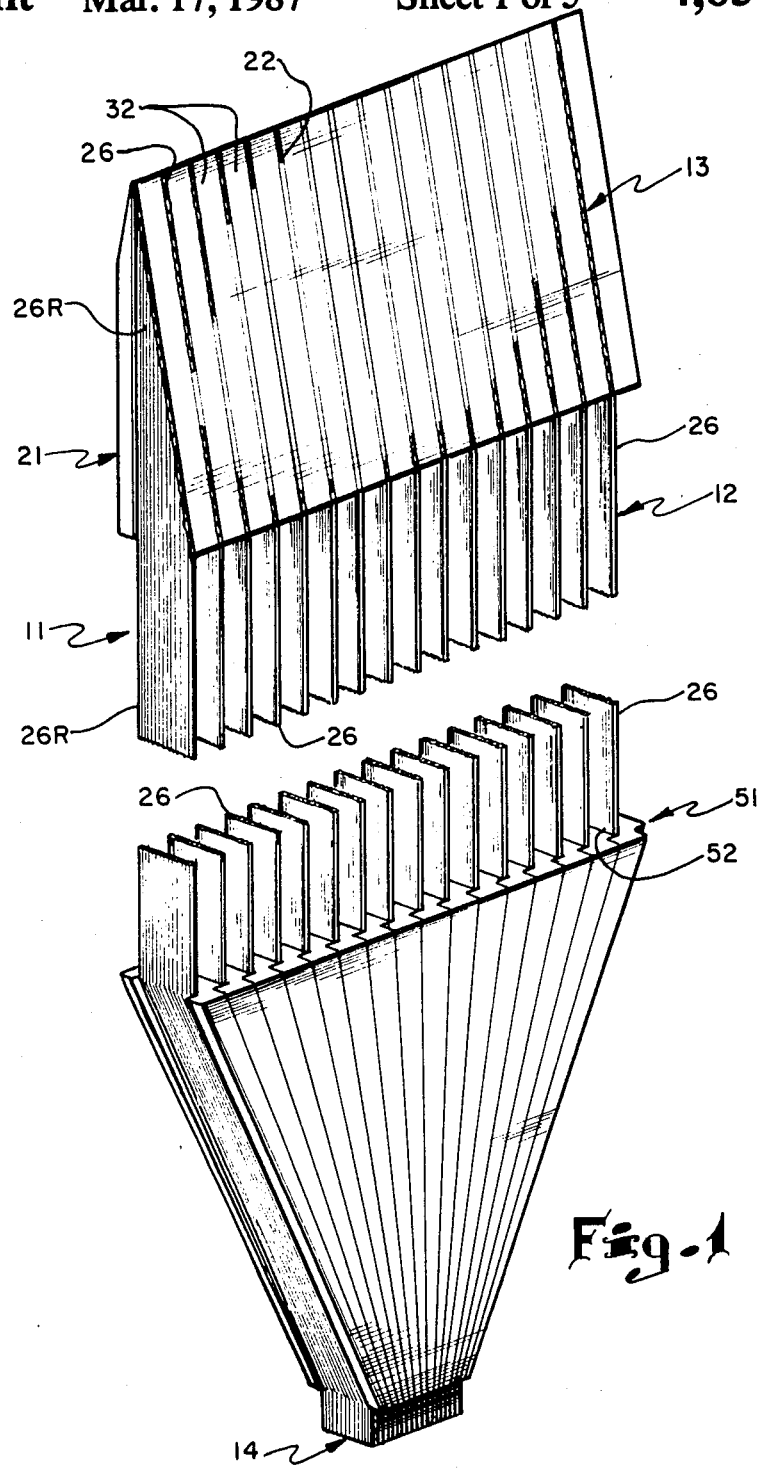
FIG. 1 is a perspective view of a light transfer device embodying features of the present invention.
Figure 2:
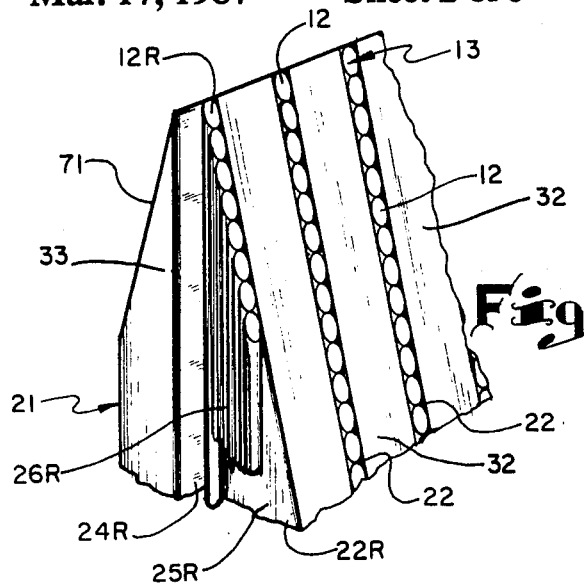
FIG. 2 is an enlarged perspective view of the upper left corner of the device shown in FIG. 2 with a portion of one fiber ribbon removed.

Referring now to FIG. 1, there is shown a light transfer device 11 according to the present invention including a plurality of optical fibers 12 forming an end surface 13 at one end and end surface 14 at the opposite end. In general, light will travel through light transfer device 11 and pass into either end surface in either direction (bi-directional) so that the end surfaces 13 and 14 are alternately a viewing surface or a light projecting surface.

The optical fibers 12 have adjacent end portions supported by a locator body 21. Body 21 is generally wedge-shaped and is formed with a multiplicity of interior parallel slots 22 extending therethrough with longitudinally facing openings at the ends, the slot to the far left as seen in FIG. 1 being open and the remaining slots being closed and all of the slots being of an identical size in transverse cross section.

The locator body 21, generally stated, has fiber supporting surfaces provided by slots 22 which precisely locate the optical fibers in relation to one another and, when adhered to these supporting surfaces, mechanically hold the fibers 12 in a fixed position relative to one another.

Figure 3:
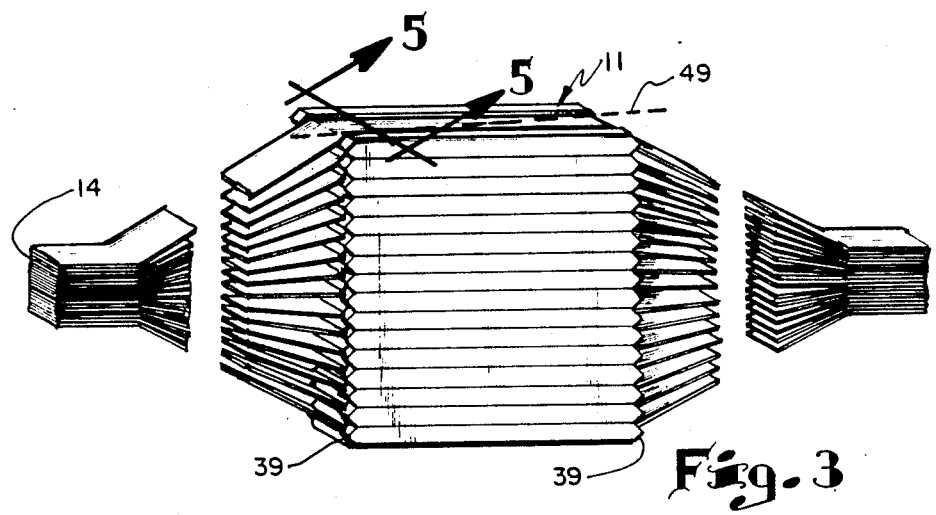
FIG. 3 is a perspective view illustrating a preferred method of making the device of FIG. 1 with the second locator members omitted.
Figure 4:
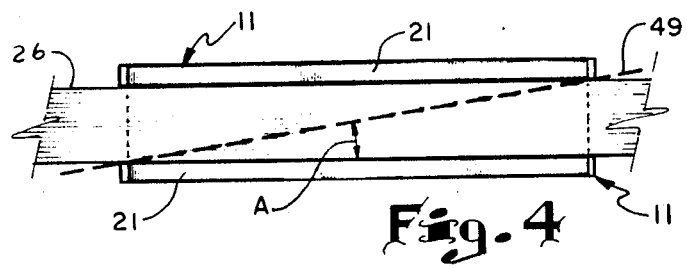
FIG. 4 is a top plan view of the assembly of FIG. 3.
Figure 5:
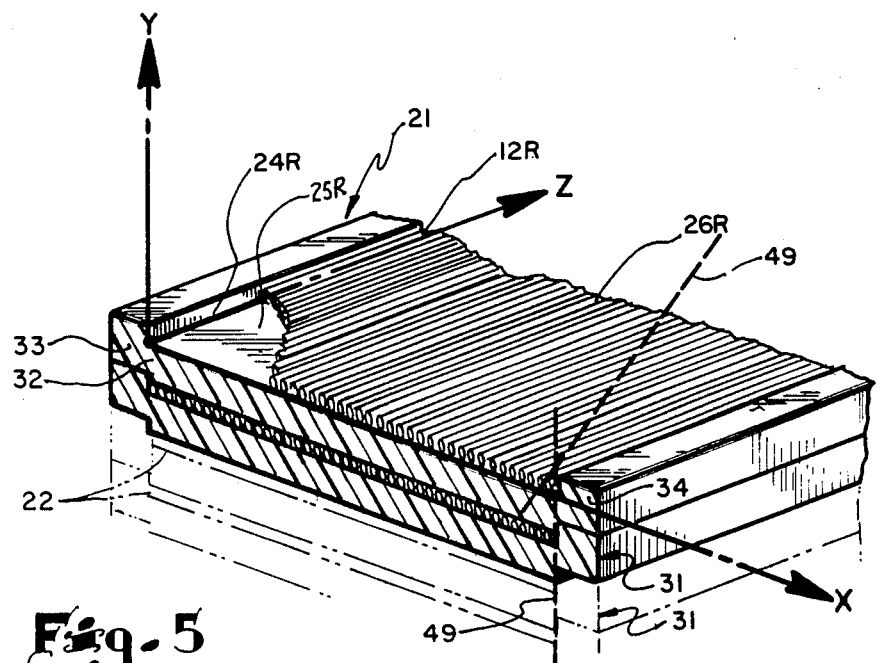
FIG. 5 is a sectional view taken along lines 5—5 of FIG. 3 with a portion of the fiber ribbon removed from the open slot.

For the purpose of further defining the fiber supporting surfaces and their positions relative to one another, reference is made to FIG. 5 and to the use of a Cartesian coordinate system with an X, Y, Z axis located on the upper left corner of the open slot, as seen in FIG. 5, which is selected as the reference slot and designated 22R. By definition the axes X, Y and Z of a Cartesian coordinate system are perpendicular to one another, as are the three planes XZ, YZ, and YX defined by these axes. The suffix "R" is used to distinguish the reference slot and the surfaces forming this slot from the further slots and to designate the fibers carried in the reference slot. FIGS. 3-5 show the preferred structure that is used to form two identical light transfer devices, as is described hereinafter.

The reference slot 22R related to the coordinate system in FIG. 5 has a first reference supporting surface 24R in the YZ plane for a reference end fiber 12R and a second reference surface 25R in the XZ plane for the reference end fiber 12R. These surfaces 24R and 25R locate a reference end fiber 12R along the YZ and XZ planes, respectively, and perpendicular to the YX plane.

Each additional slot 22 in body 21, then, has what is referred to as a first supporting surface 24 in the YZ plane and a second supporting surface 25 in a second plane parallel to and displaced a fixed distance from the reference second plane.

These first and second supporting surfaces locate the fibers and, when adhered to the fibers, mechanically hold the fibers against movement relative to one another in three mutually perpendicular planes, which prevents the plurality of spaced fiber ribbons from being skewed or squirreled at an angle along the lengths thereof.

A preferred method of making the above described locator body is to use a plurality of identical generally channel-shaped locator members 31 stacked one on another, as shown in FIGS. 3-6.

Each locator member 31 has a spacer portion 32 and stepped out projecting portions 33 and 34 at the opposite ends of the spacer portion, together with stepped in notched portions 43 and 54 opposite projecting portions 33 and 34, respectively. For reference purposes the spacer portion 32 has oppositely disposed surfaces 25 and 45, projecting portion 33 has surfaces 24 and 38 at right angles to one another, projecting portion 34 has surfaces 44 and 48 at right angles to one another, notched portion 43 has surfaces 36 and 37 at right angles to one another, and notched portion 54 has surfaces 46 and 47 at right angles to one another. The notched portions 43 and 54 are complementary in shape with projections 33 and 34 but are not as deep as the projections so that, when the notched portions 43 and 54 are placed on the projecting portions of another locator member 31 in a nesting or stacked relation, the spacing for slot 22 is formed. It will be noted that surfaces 24 and 37 are in the same plane and surfaces 44 and 47 are in the same plane.

Referring now to FIG. 3, the ends of each locator member are shown tapered or V-shaped, as indicated at 39, so that there are no sharp corners or right angle bends for the relatively brittle fibers.

In a preferred procedure for making the device 11 using the channel-shaped locator member as above discussed, an adhesive is placed along the inside of the channel of one member 31 and a fiber ribbon 26 is placed on the inside surfaces with the end fibers of the ribbon abutting against adjacent inside surfaces 24 and 44 to hold the ribbon in place. Preferably, the channel defined by surfaces 24 and 44 is the same width as the fiber ribbon.

The adhesive is placed on the top of the ribbon so disposed in the channel and on surfaces 48 and 38. A second locator member 31 is placed on the first with the spacer portion surfaces 37 and 47 inserting into the channel surfaces 24 and 44, respectively, the spacer portion surface 45 pressing down on the top of the fiber ribbon. Succeeding locator members 31 and fiber ribbons are stacked one on the other until the desired stack is achieved. The depth of the stack establishes the lateral extent of the body 21, as seen in FIG. 1.

The fibers 12 secured in the assembled channel-shaped locator member 31 are then cut down through the stack, as shown in FIG. 3, along a plane designated 49 that is rotated 90° to the plane of the fiber ribbon or XZ plane and at a slight angle, designated A, to the rotated plane to define the end surface 13 with the cut fiber ends.

This method of making provides two identical light transfer devices 11. A sharp angle A provides greater surface area. A preferred angle A is between 8° and 10° to the axis of the fibers.

The opposite end portions of the fibers 12 preferably are supported in the same manner, using a locator body 51 with interior slots 52, again shown as made up of a plurality of channel-shaped locator members 61 stacked one on another in the same manner as are locator members 31 above described. These channel-shaped members preferably have the same channel width as the ribbon but decrease in thickness along their length to bring the fibers to a solid bundle having a uniform array of rows and columns at the end surface 14.

Figure 6:
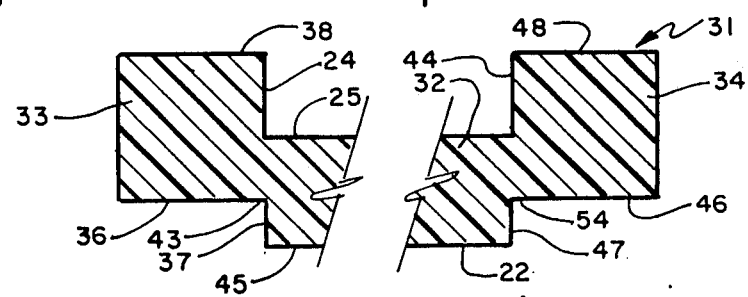
FIG. 6 is a fragmentary cross-sectional view of the locator body shown in FIG. 5.
Figure 7:
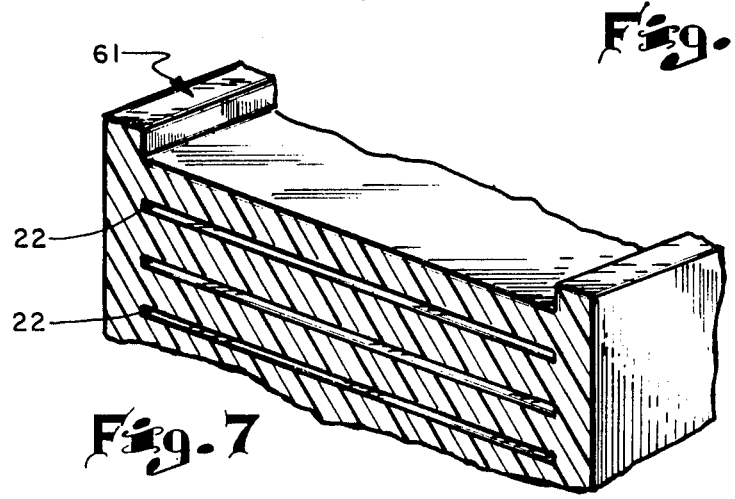
FIG. 7 is a perspective view of a portion of a solid locator body.

An alternative to the stacked channel-shaped locator members above described would be to form a unitary rectangular block 61 and to use a cutting tool such as a laser to form the reference slot 22R and slots 22 for a ribbon of fibers, as is illustrated in FIG. 6. An adhesive would be placed on the ribbon and the ribbon of fibers would be slid through the longitudinally facing openings of the slots.

Figure 11:
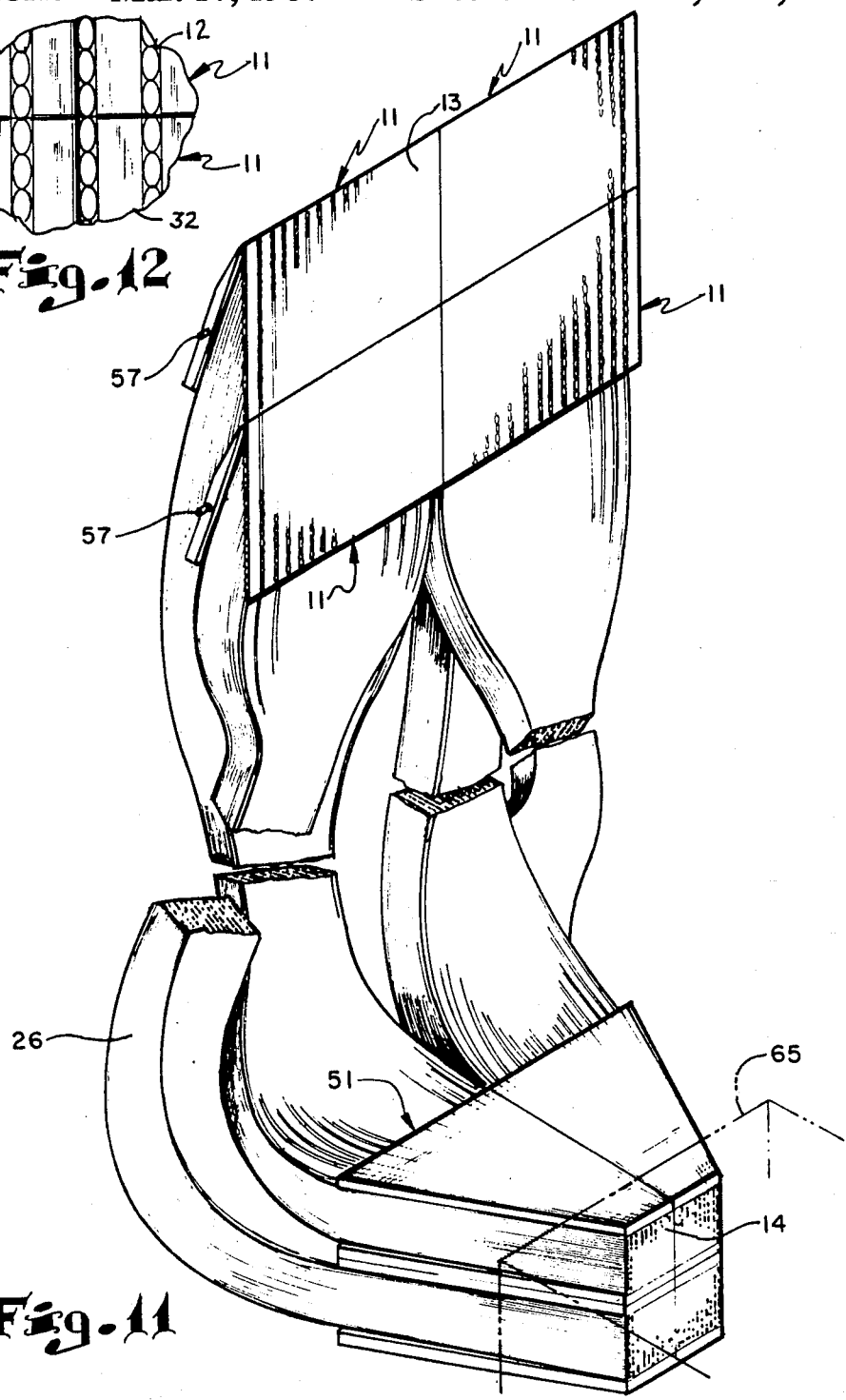
FIG. 11 is a modular assembly of four of the light transfer devices shown in FIG. 1.

The support body 21 above described is particularly suitable for being stacked side by side and end to end to enlarge the end surfaces as required. A modular assembly of two of the devices which form end surfaces 13 side by side and two more end to end is shown in FIG. 11. The two side by side are shown separated in FIG. 10 but when brought together the projecting portion 33 and ribbon portion 26 along one side mate with the notched portion 43 and surface 45 of the adjacent device to provide uniformity in the succession of the fiber ribbon 26 and spacer portion 32 between the two devices.

A pin 57 extends through alined holes in the projecting portion 33 of the bodies 21 to position these bodies and hold them side by side.

Figure 12:
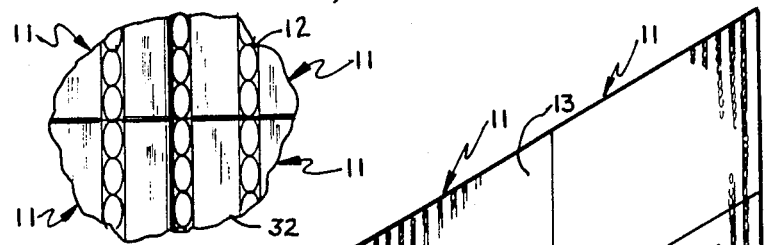
FIG. 12 is a fragmentary plan view of the central portion of the modular assembly shown in FIG. 11.

For stacking end to end, an angular cut 71 is provided along projecting section 33 at the narrow end to allow the ribbons to pass along the back side of the modular array, as shown in FIG. 12. In the end to end stacking of the devices forming end surfaces 13 the ribbons line up in straight lines and the spacer portions 32 line up in straight lines. It is noted in FIG. 11 that the end surface 13 of the device 11 in the upper right-hand corner has its end surface 14 also in the upper right-hand corner. The fibers in the end surface proceed from top to bottom, while corresponding fibers at end surface 14 proceed from bottom to top in the ribbon.

A block 65 is shown adjacent surface 14 in the modular assembly. This may be used for inputting light by a variety of means including, but not limited to, kinescopes (crt), microshutters with a light source behind, lasers, liquid crystal shutters, or similar light control mechanisms. The cut ends of the fibers may be located with a material such as phosphorus encased in a vacuum and may have either light or electron beams projected at the cut end surface. If the direction of light were to be reversed through the device 11, the block 65 would be receiving light from a source at end surface 13.

In a specific example of the construction and use of the light transfer device, the lateral extent or width of surface 13 is 8" and the vertical extent is 6" for a 4:3 width to height ratio. Each ribbon is 1" wide and contains 333 fibers, each of which is 0.003" in diameter. The center to center spacing of the ribbons is 0.018". The spacer section is 0.015". The matrix at the end surface 14 is 1" by 1.332", providing a gain of 36:1. The angle of cut A is 9.6°.

A preferred fiber for this application is in the range of 3 to 100 microns in diameter and has a wavelength of 400–700 nanometers. The fiber is coated black to prevent cross-talk and has a 3 db. loss over 1000'. If the ends are coated with a phosphor, an electron beam is able to excite these ends.

Although the present invention has been described with a certain degree of particularity, it is understood that the present disclosure has been made by way of example and that changes in details of structure may be made without departing from the spirit thereof.

What is claimed is:

1. A fiber optic light transfer device comprising:
   a plurality of optical fibers arranged as a series of spaced, parallel fiber ribbons; and
   locator means for said fibers at one end portion of said fibers including a locator body having a series of spaced, parallel flanged locator body portions arranged parallel to said fiber ribbons defining a multiplicity of spaced, parallel slots extending through said body in which said ribbons are disposed, each said locator body portion having a spacer and a flange projecting out from one end of said spacer, said flanges being arranged end-to-end and said spacers being arranged in spaced parallel planes, said ribbons and spacers being successively arranged in an alternating series, each said flange having a first supporting surface against which an end fiber of an associated ribbon is positioned and each said spacer having a second supporting surface against which a face of an associated ribbon is positioned, said first and second supporting surfaces being disposed in first and second mutually perpendicular planes, said surfaces extending generally parallel to associated of said fibers to support said fibers along the fibers,
   one of said slots being a reference slot for locating a reference end fiber that extends perpendicular to a third plane that is mutually perpendicular to said first and second planes and a reference fiber ribbon in a reference of said second planes, there being further first and second supporting surfaces of further slots locating further end fibers in said first plane and further fiber ribbons at equally spaced intervals in second planes parallel to and displaced from said second reference plane to precisely locate and be adhered to the associated supporting surface to mechanically hold said fibers against movement relative to one another in relation to three mutually perpendicular planes,
   said secured fibers having exposed fiber ends terminating along a plane that is rotated 90 degrees to the plane of each ribbon and at an angle to said rotated plane to define an end surface with said exposed fiber ends.

2. A fiber optic light transfer device as set forth in claim 1 including a second locator body opposite said one end portion of said fibers having slots corresponding in size to the slots of said locator body of said locator means, said second locator body being tapered along its length to bring the fibers into a relatively tight array of rows and columns at a second end surface.

3. A fiber optic light transfer device as set forth in claim 1 wherein said locator body is generally wedge-shaped, the reference slot being open along part of the periphery thereof and the further slots closed along the entire periphery thereof.

4. A fiber optic light transfer device as set forth in claim 1 wherein each of said locator body has a ribbon along one side and a spacer along the opposite side whereby two of said locator bodies disposed side by side form a modular assembly having alternating fiber ribbons and spacers with consistent spacing therebetween.

5. A fiber optic light transfer device as set forth in claim 1 wherein said locator body is comprised of a plurality of channel-shaped locator members stacked one on another and cut along a diagonal line down through the stack.

6. A fiber optic light transfer device as set forth in claim 5 wherein each locator portion has a stepped in notch opposite and complementary in shape to an associated flange, the inside surfaces of said flange and associated notch being in the same plane with the extent of the flange greater than the depth of the notch, whereby the locator members readily stack one on another and form a slot between two members stacked one on another.

7. A fiber optic light transfer device as set forth in claim 1 wherein said locator body is a solid one-piece body in which the slots are formed.

8. A fiber optic light transfer device as set forth in claim 6 wherein each spacer portion is of uniform thickness to provide equal spacing between the fiber ribbons.

9. A fiber optic light transfer device as set forth in claim 1 wherein said angle is between 8° and 10° to provide an increased surface area for said end surface.

10. A fiber optic light transfer device as set forth in claim 1 wherein said body is tapered along an edge to permit successive bodies to be stacked end to end to form a modular assembly.

11. A fiber optic light transfer device as set forth in claim 1 wherein said body has V-shaped surfaces at each end between ribbons to avoid a sharp bend in the fibers.

12. A fiber optic image transfer device comprising:
    a plurality of optical fibers arranged as a series of spaced, parallel fiber ribbons; and
    first locator means for said fibers at one end portion of said fibers including a first generally wedge-shaped locator body having a series of spaced, parallel flanged locator body portions arranged parallel to said fiber ribbons defining a multiplicity of spaced, parallel slots extending through said body in which said ribbons are disposed, each said locator body portion having a spacer and a flange projecting out from one end of said spacer, said flanges being arranged end-to-end and said spacers being arranged in spaced parallel planes, said ribbons and spacers being successively arranged in an alternative series, each said flange having a first supporting surface against which an end fiber of an associated ribbon is positioned and each said spacer having a second supporting surface against which a face of an associate ribbon is positioned, said first and second supporting surfaces being disposed in first and second mutually perpendicular planes, said surfaces extending generally parallel to associated of said fibers to support said fibers along the fibers, one of said slots being a reference slot for locating a reference end fiber that extends perpendicular to a third plane that is mutually perpendicular to said first and second planes and a reference fiber ribbon in a reference of said second planes, there being further first and second supporting surfaces of further slots locating further end fibers in said first plane and further fiber ribbons at equally spaced intervals in second planes parallel to and displaced from said second reference plane to precisely locate and be adhered to the associated supporting surface to mechanically hold said fibers against movement relative to one another in relation to three mutually perpendicular planes, said secured fibers having exposed fiber ends terminating along a plane that is rotated 90 degrees to the plane of each ribbon and at an angle to said rotated plane to define an end surface with said exposed fiber ends; and second locator means at the other end portion of said fibers including a second generally wedge-shaped locator body having a multiplicity of parallel slots corresponding in shape to the slots of said first locator means, said second body being tapered along its length to bring said fibers into a tightly packed array of rows and columns of fibers.

13. A method of making a fiber optic light transfer device comprising the steps of:

providing a locator body having a series of spaced, parallel flanged locator body portions arranged parallel to said fiber ribbons defining a multiplicity of spaced, parallel slots extending through said body in which said ribbons are disposed, each said locator body portion having a spacer and a flange projecting out from one end of said spacer, said flanges being arranged end-to-end and said spacers being arranged in spaced parallel planes, said ribbons and spacers being successively arranged in an alternating series, each said flange having a first supporting surface against which an end fiber of an associated ribbon is positioned and each said spacer having a second supporting surface against which a face of an associated ribbon is positioned, said first and second supporting surfaces being disposed in first and second mutually perpendicular planes, one of said slots being a reference slot for locating a reference end fiber that extends perpendicular to a third plane that is mutually perpendicular to said first and second planes and a reference fiber ribbon in said second planes, there being further first and second supporting surfaces of further slots locating further end fibers in said first plane and further fiber ribbons at equally spaced intervals in second planes parallel to and displaced from said second reference plane;

securing a fiber ribbon in each of said slots to mechanically hold said fibers against movement relative to one another in relation to three mutually perpendicular planes; and terminating said secured fibers to form exposed fiber ends that is rotated 90 degrees to the plane of each ribbon and at a slight angle to said rotated plane to define an end surface with said exposed fiber ends and form two identical light transfer devices.

14. A method of making a fiber optic light transfer device comprising the steps of:

placing intermediate portions of a ribbon of optical fibers to which an adhesive has been applied in the channel of a first channel-shaped locator member, each channel-shaped locator member having a spacer portion, a stepped out projecting flange portion extending out from opposite end portions of said spacer portion, and a stepped in notched portion opposite and complementary in shape to each projecting flange portion;

stacking another identical locator member on said first locator member, with the flange portions of said first member fitting into the notched portions of said another locator member and repeating the procedure with the desired number of ribbons and locator members to form an integral block; and cutting vertically through said stack of locator members on an angle to the longitudinal axis of said fibers to form two identical light transfer devices.

15. A fiber optic light transfer device as set forth in claim 4 wherein the flanges of said two locator bodies in said modular assembly are connected together.

16. A fiber optic light transfer device as set forth in claim 1 wherein the opposite end fibers of each ribbon form the end extremities of each locator body whereby two of said locator bodies disposed end-to-end form a modular assembly having the ribbons of one locator body aligned with the ribbons of the other locator body.

* * * * *